United States Patent [19]

Opris et al.

[11] Patent Number: 5,838,191
[45] Date of Patent: Nov. 17, 1998

[54] BIAS CIRCUIT FOR SWITCHED CAPACITOR APPLICATIONS

[75] Inventors: Ion E. Opris, Stanford; Laurence D. Lewicki, Sunnyvale, both of Calif.

[73] Assignee: National Semiconductor Corporation, Santa Clara, Calif.

[21] Appl. No.: 804,169

[22] Filed: Feb. 21, 1997

[51] Int. Cl.[6] ........................................... G05F 1/10
[52] U.S. Cl. .......................... 327/539; 327/530; 327/543
[58] Field of Search ................................... 323/315, 316, 323/317; 327/530, 66, 538, 543, 382, 362, 512, 513, 539, 540

[56] References Cited

U.S. PATENT DOCUMENTS

| | | | |
|---|---|---|---|
| 4,489,282 | 12/1984 | Jett, Jr. ..................................... | 330/261 |
| 4,714,901 | 12/1987 | Jain et al. ................................ | 331/176 |
| 5,289,058 | 2/1994 | Okamoto ................................. | 307/490 |
| 5,512,855 | 4/1996 | Kimura .................................... | 327/538 |
| 5,543,746 | 8/1996 | Kuo ......................................... | 327/543 |
| 5,587,674 | 12/1996 | Danstrom ................................. | 327/67 |

OTHER PUBLICATIONS

B.Y. Kamath, R.G. Meyer, and P.R. Gray "Relationship between frequency response and settling time of operational amplifiers," *IEEE Journal of Solid State Circuits*, vol. SC–9, (6), pp. 347–352, Dec. 1974.

S.M. Sze, *Physics of Semiconductor Devices*, 2nd ed., New York: John Wiley & Sons, 1981 pp. 27–30.

Dennis M. Monticelli, "A Quad CMOS Single–Supply Op Amp with Rail–to–Rail Output Swing," *IEEE Journal of Solid–State Circuits*, vol. SC–21, No. 6, Dec. 1986.

Primary Examiner—Timothy P. Callahan
Assistant Examiner—Hai L. Nguyen
Attorney, Agent, or Firm—Limbach & Limbach L.L.P.; Seong-Kun Oh

[57] ABSTRACT

An adaptive bias circuit for switched capacitor applications that compensates for temperature and process variations by maintaining a constant settling time of CMOS operational amplifiers is introduced. To this end, the adaptive bias circuit allows a dynamic trade-off between the slew-rate and the gain bandwidth product which allows the output of the operational amplifier to settle within a certain predetermined precision. A first aspect of the invention includes a current source providing a same current to a pair of transistors having different effective current densities. A resistor is coupled between the pair of transistors while from one end of the resistor, a constant bias current is drawn. In this manner, a voltage difference develops across the resistor which effectively indicates the change in the transconductance of the pair of transistors with respect to temperature and process variations. Another aspect of the invention allows the bias circuit to minimize the body effect, the back bias effect, the channel length modulation effect, as well as the dependence of circuit performance upon the power supply voltage.

17 Claims, 9 Drawing Sheets

BIAS CIRCUIT FOR SWITCHED CAPACITOR APPLICATIONS

BACKGROUND OF THE INVENTION

1. Field of the Invention

The present invention relates to the field of complementary metal oxide semiconductor (CMOS) bias reference circuits. In particular, the present invention relates to bias circuits capable of compensating for process and temperature variations by maintaining a constant settling time of CMOS operational amplifiers (op amps), especially in switched capacitor applications.

2. Description of the Related Art

The settling time of an amplifier is made up of two distinct periods. The first period is called the slew time during which the amplifier output makes the transition from the original output voltage to the vicinity of the new value. During this period, the amplifier acts in a grossly nonlinear fashion and the length of this period is generally determined by the current available to charge the amplifier compensation capacitance. The second portion of the settling time is the period after slew limiting when the amplifier output is near its final value and the circuit acts in a quasi-linear fashion.

Sampled data analog systems in metal oxide semiconductor (MOS) technology are based almost exclusively on switched capacitor circuits. The maximum operational speed of these circuits is limited essentially by the settling time for a given precision. This settling time, on the other hand is determined by the slew-rate (large signal settling) and the gain-bandwidth product (small signal settling) of the operational amplifier (op amp).

Single gain stage operational amplifiers are used for their power efficiency, small area, and good stability with capacitive load. For single dominant pole operational amplifiers, the slew-rate and the small signal gain-bandwidth product are related through the MOS input device parameters which are both temperature dependent and process dependent. In other words, the slew-rate and the small signal gain-bandwidth product of these op amps are dependent upon oxide thickness, channel length etching, carrier mobility, doping of the MOS input devices, and the bias current.

An approximation for the settling time $T_s$ of a single dominant pole, slew-rate limited operational amplifier is given by the following equation.

$$T_s = \frac{V_o \cdot C}{I} + \frac{N}{2 \cdot \pi \cdot f_u} \tag{1}$$

Where $V_o$=output voltage step;
I=maximum available current for slewing;
C=the total load capacitance including all parasitics;
$f_u$=closed loop bandwidth; and
N=number of time constants The number of time constants N needed for exponential settling within a given precision E can be further expressed in the following form.

$$N = \ln\left(\frac{V_o}{\epsilon}\right) \tag{2}$$

As can be seen from equation (2), due to the logarithmic dependence on the input linear range, the number of time constants N can be considered approximately constant.

For a simplified structure of a MOS single stage amplifier with a capacitive load as illustrated in FIG. 1, the slew-rate is determined by the maximum available current I and the total load capacitance C. The closed loop bandwidth $f_u$, of this amplifier, on the other hand, is determined by the following equation.

$$f_u = \frac{\beta \cdot g_m}{2 \cdot \pi \cdot C} \tag{3}$$

where β=feedback transfer function. Substituting equation (3) into equation (1), the total settling time $T_s$ as given by Equation (1) can then be represented by the following expression.

$$T_s = \frac{V_o \cdot C}{I} + \frac{N \cdot C}{\beta \cdot g_m} \tag{4}$$

In addition, the transconductance $g_m$ of a MOS transistor in saturation is given by the following equation.

$$g_m = \sqrt{2 \cdot I \cdot K \cdot \frac{W}{L}} \tag{5}$$

where K is a geometric current scaling factor of the MOS transistor which is both process and temperature dependent, and W/L is the ratio of the effective width of the channel to the effective length of the channel of the transistors. Therefore, it can be seen from Equation (4) that the total settling time $T_s$, has a strong dependence on the transconductance $g_m$ of the input MOS devices. In turn, the transconductance $g_m$ is, as can be seen from Equation (5), is both process and temperature dependent through its dependence upon the geometric current scaling factor W/L which varies according to changes in temperature and process. For a given constant bias current $I_0$, the MOS transistor transconductance $g_m$ decreases with temperature because of the carrier mobility temperature dependence. For a discussion of the temperature dependence of carrier mobility in MOS devices, see S. M. Sze, "Physics of Semiconductors," 2d ed., New York, John Riley & Sons, pp.28, 1981.

However, a constant current biasing circuit fails to optimize the power consumption over process and temperature variations since the bias current must be high enough to guarantee a minimum transconductance value yielding the worst case (maximum) settling time. With such a biasing configuration, the settling time $T_s$ of Equation (4) will increase with temperature.

A partial compensation for the carrier mobility decrease with temperature can be achieved with a Proportional To Absolute Temperature (PTAT) current source. In PTAT current sources, the transconductance $g_m$ change with temperature can be substantially reduced. A conventional integrated circuit (IC) PTAT current will have a temperature coefficient of about +3300 parts per million (ppm) per degree Kelvin minus the positive temperature coefficient of the integrated resistor used. If a heavily doped diffused resistor is used, the resulting temperature coefficient could be about +3000 ppm per degree Kelvin. Alternatively, a lightly doped resistor can be employed to create a temperature coefficient closer to zero.

In most PTAT biased circuits, however, the decrease in the slewing time over-compensates the decrease in MOS transconductance $g_m$ with temperature, and the overall settling time will, in fact, decrease with temperature. A second drawback to PTAT biased circuits is that the PTAT biasing increases the gate overdrive voltage, $V_{gs}-V_{th}$, (where $V_{gs}$= gate to source voltage, and $V_{th}$=threshold voltage) thereby decreasing the dynamic range at high temperatures. A combination of constant current and PTAT bias approaches can be very effective in reducing the settling time dependence with temperature. However, the settling time still remains largely process dependent.

To numerically illustrate several of the above conventional approaches, a single ended telescopic cascode amplifier (FIG. 2) is chosen with a bias current I of 50 μA. The process variations are established with three sets of transistor models (typical, fast, and slow), while the temperature was varied over the full military range, i.e., from −55° C. to +125° C. The typical open loop gain of 83.5 dB with a variation over process and temperature conditions between 82.1 dB and 84.5 dB was selected. Based upon the above configuration, the nominal settling time within 0.025% (12 bits accuracy) of the final value based upon a 2 volt input step was 65 ns.

FIG. 3 illustrates the settling time variation over process and temperature for the constant bias current approach. In particular, it can be seen from FIG. 3 that for the constant bias current approach, the settling time varies over 40%. For the chosen range of temperature variation, the settling time for the typical transistor model 302 varied from approximately 57.5 ns to 72 ns while that of the slow transistor model 301 and fast transistor model 303 ranged over 54.5 ns to 68 ns and 60.5 ns to 78 ns respectively. As shown in FIG. 4, the PTAT bias current approach also gives a variation of about 40% in the settling time for the slow transistor model 401, the typical transistor model 402, and the fast transistor model 403.

FIG. 5 illustrates the settling time using a 60% PTAT bias current with a total temperature coefficient of 2,000 ppm/° C. Although the temperature effect is reduced, it can be seen that the variation over the process model remains higher than 16%. These results are summarized in Table 1.

TABLE 1

MOS transistor models and the settling time variation over temperature.

| Model | $\beta_n(\mu A/V^2)$ | $l_{eff}(\mu m)$ | I-const. (ns) | I-PTAT (ns) | I-60% PTAT (ns) |
|---|---|---|---|---|---|
| slow | 69.6 | 2.27 | 60.3–78 | 78–65 | 70–69 |
| typical | 76.2 | 2.02 | 57.5–72 | 75–60 | 67–64 |
| fast | 86.5 | 1.88 | 54.5–68 | 72–56 | 64–60 |

Another biasing approach is directed to maintaining a constant transconductance $g_m$, therefore, to maintain a constant small signal unity gain operational amplifier bandwidth over process or temperature variations. For further discussion of this approach, see Jett, Jr., "CMOS Op Amp Bias Circuit" U.S. Pat. No. 4,489,282. A problem with this approach, however, is that maintaining a constant transconductance $g_m$ is achieved by changing the biasing current i.e., the maximum available current for slewing, which in turn changes the slew rate, and therefore, changes the settling time $T_s$ as shown by Equation (4). Therefore, such constant transconductance $g_m$ biasing circuit results in a longer settling time at lower temperatures.

For switched capacitor circuits, the best power efficiency is obtained with a bias circuit that ensures a quasi-constant settling time over process and temperature variations. However, the main contributor to the settling time variation continues to be process-dependent resistor variations. Therefore, a bias circuit capable of optimizing power efficiency through compensating for process and temperature variations thereby ensuring a quasi-constant settling time is desired.

SUMMARY OF THE INVENTION

It is an object of this invention to provide a bias reference circuit and method thereof which optimizes power efficiency over process and temperature variations by maintaining a quasi-constant settling time by a dynamic trade-off between the slew-rate and the unity gain bandwidth of the input MOS device parameters.

According to a first embodiment of the present invention, there is provided an adaptive bias circuit for providing a bias current over variations in operating conditions. The adaptive bias circuit comprises a first transistor having first, second, and third terminals; a second transistor having fourth, fifth, and sixth terminals where the fourth and sixth terminals are coupled to the third terminal; a first current source coupled to the first and fourth terminals respectively where the first transistor operates at a first effective current density and said second transistor operates at a second effective current density; a second current source coupled to the second terminal configured to draw a constant current; and a resistance coupled between said second and fifth terminals wherein a voltage develops across said resistance in accordance with the first and second transistors operating at the first and second effective current densities.

According to another embodiment of the present, there is provided another adaptive bias circuit for providing a bias current over variations in operating conditions, the adaptive bias circuit comprising a first transistor having first, second, and third terminals, said first transistor second terminal coupled to a reference terminal, a second transistor having fourth, fifth, and sixth terminals, the fifth terminal coupled to the reference terminal, a first current source coupled to the first and fourth terminals respectively where the first transistor operates at a first effective current density and the second transistor operates at a second effective current density, a second current source configured to draw a first constant current, a first node configured to couple the fourth terminal and the second current source such that the second current source draws the first constant current from the first node; a third current source configured to provide a second constant current; a second node configured to receive the second constant current from the third current source, the second node further configured to couple the first terminal and the sixth terminal; and a resistive element coupled between the first and second nodes where a voltage develops across the resistance in accordance with the first and second transistors operating at the first and second effective current densities.

These and other features and advantages of the present invention will be understood upon consideration of the following detailed description of the invention and the accompanying drawings.

DESCRIPTION OF THE PREFERRED EMBODIMENT

Figure 6:
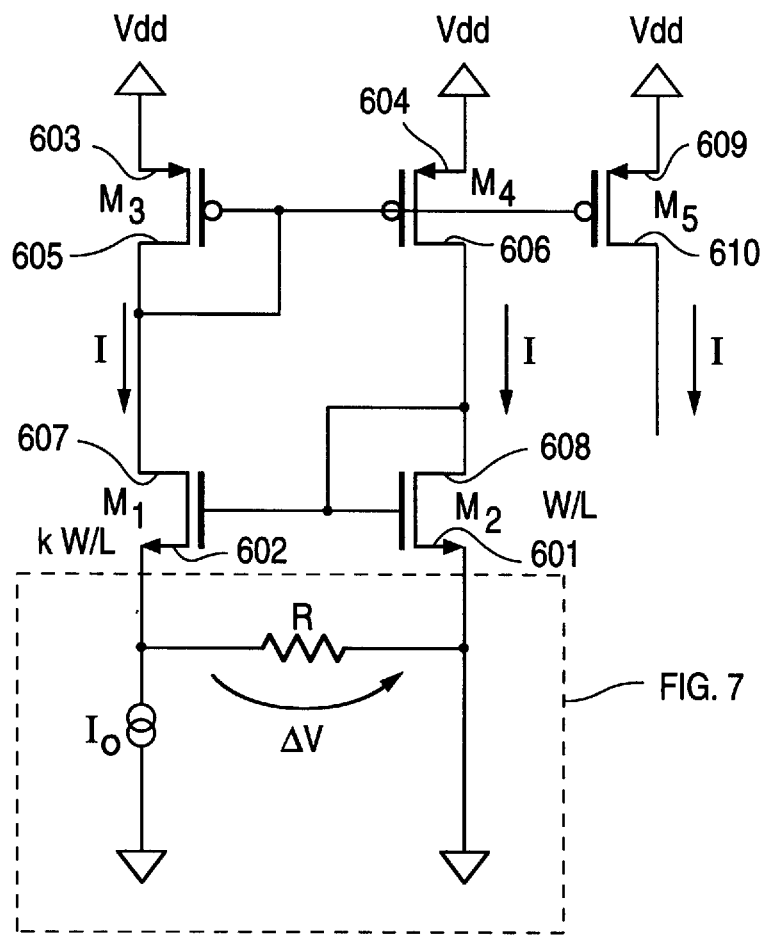
FIG. 6 illustrates one embodiment of a quasi-constant settling time bias circuit according to the present invention.

FIG. 6 illustrates a bias circuit according to one embodiment of the present invention. A resistor R is coupled between source terminals 601, 602 of a nMOS transistor pair $M_1$, $M_2$. The geometric factor W/L of $M_1$ is k times larger than that of $M_2$. A pMOS current mirror $M_3$, $M_4$ forces an equal bias current I through the two nMOS transistors $M_1$, $M_2$. In particular, as illustrated in FIG. 6, the source terminals 603, 604 of the pMOS transistors $M_3$, $M_4$ are coupled to a dc bias voltage terminal Vdd while the drain terminals 605, 606 provide equal bias currents I to the drain terminals 607, 608 of the nMOS transistors $M_1$, $M_2$.

According to this embodiment, a third pMOS transistor $M_5$ has its source terminal 609 coupled to the dc bias voltage terminal Vdd while the drain terminal 610 of transistor $M_5$ is configured to provide an output for the present bias circuit configured to bias the amplifier. As shown in FIG. 6, a constant bias current $I_0$ is provided at the source terminal 602 of the first nMOS transistor $M_1$ to establish the slew rate of the bias circuit.

Due to the geometric current scaling (difference by a ratio of K) between $M_1$ and $M_2$, a difference in gate-to-source overdrive voltages $\Delta V_{gs}$ for $M_1$ and $M_2$ develops across the resistor R which is expressed by the following equation.

$$\Delta V_{gs} = \Delta V \cdot \left(1 - \frac{1}{\sqrt{k}}\right) \quad (6)$$

Where $\Delta V$ is the gate-to-source overdrive voltage for transistor $M_2$ with drain current I. This gate-to-source overdrive voltage $\Delta V$ for transistor $M_2$ with drain current I can also be related to the device small signal transconductance $g_m$ by the following equation.

$$\Delta V = V_{gs} - V_{th} = \frac{2 \cdot I}{g_m} \quad (7)$$

Where $V_{gs}$ is the gate-to-source voltage for transistor $M_2$. The total bias current I then satisfies the following relation:

$$I = I_o + \frac{\Delta V_{gs}}{R} \quad (8)$$

Where $I_0$= constant bias current. Rewriting equation (4), the following expression can be obtained.

$$I = \frac{V_o \cdot C}{T_s} + \frac{N \cdot C}{\beta \cdot T_s} \cdot \frac{I}{g_m} \quad (9)$$

By comparing equations (8) and (9), it can be seen that the two are in similar form. In other words, equation (8) for the total bias current will hold as long as the constant bias current $I_0$ and the resistor R as expressed in equation (8) are as follows.

$$I_o = \frac{V_o \cdot C}{T_s} \quad (10)$$

$$R = \frac{2 \cdot \beta \cdot T_s \cdot \left(1 - \frac{1}{\sqrt{k}}\right)}{N \cdot C} \quad (11)$$

With values for the constant bias current $I_0$ and the resistor R governed by equations (10) and (11), equation (8) can be satisfied independent from any process or temperature variations. In other words, with careful design configuration to ensure that the constant bias current $I_0$ and the resistor R values correspond to equations (10) and (11), respectively, the total bias current I of equation (8) becomes independent of the transistor transconductance $g_m$. As long as the approximations used in equation (1) hold, this biasing configuration ensures constant settling time and maximum power efficiency over process and temperature variations.

Empirical data indicate that the voltage drop across the resistor R should be nominally in the range of 150–200 mV in order to have the main amplifier devices in strong inversion but with a low overdrive voltage (for high transconductance gain). A value in the specified range above also minimizes the effect of random threshold mismatch between transistors $M_1$ and $M_2$ to the order of a few millivolts. Furthermore, temperature-independent variations in the resistor R are not very significant since such variation can be compensated with a corresponding temperature coefficient in the constant bias current $I_o$. Process variations on the other hand are directly reflected in the settling time. A 10% variation of the nominal value is normally acceptable. This problem is common to all the other biasing schemes discussed, and it is also present in setting the constant bias current $I_0$. This resistance change over process remains the main contributor to the lot-to-lot settling time variation.

Equation (8) assumes the same threshold voltage for transistors $M_1$ and $M_2$, neglecting the back bias effect resulting from a difference in the voltage drop across transistors $M_1$ and $M_2$. Since the gate to source overdrive voltage $\Delta V$ is designed to be small, the back bias effect can be neglected, and, in addition, its effect can be incorporated in the resistor R.

Figure 7:
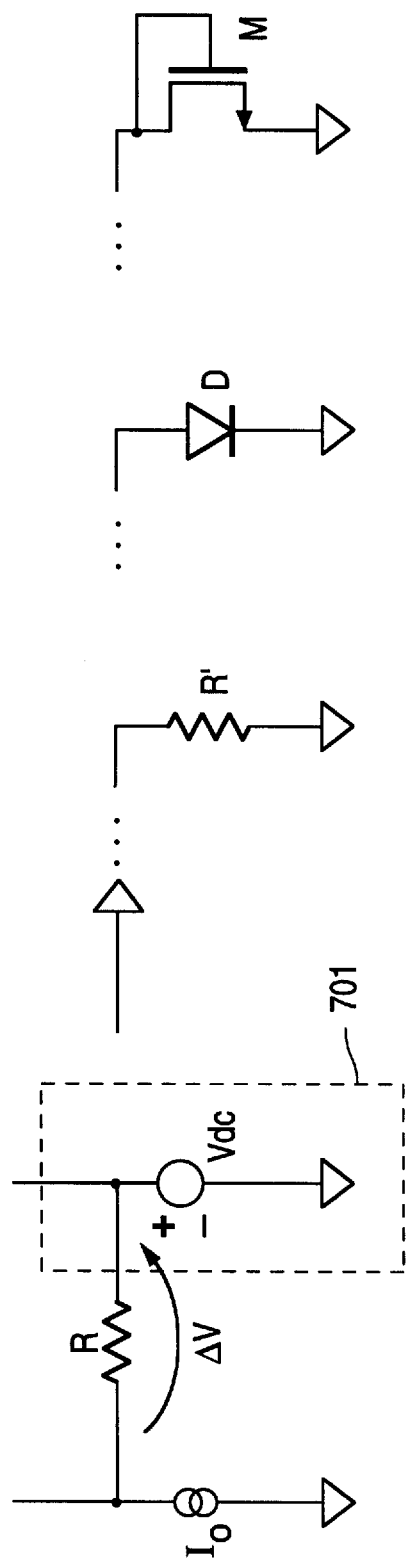
FIG. 7 illustrates the various ways to implement voltage compliance of the constant bias current source of FIG. 2.

Referring to FIG. 7, transistor $M_2$ (of FIG. 6) whose source terminal 601 is directly grounded can be coupled to a constant voltage element 701 to avoid the constant bias current source $I_0$ from saturating. Specifically, the voltage compliance of the constant bias current source $I_0$ can be accommodated with a simple dc voltage source Vdc, a resistor R, a pn diode D, or a diode-connected MOS transistor M coupled to the source terminal 601 (FIG. 6) of transistor $M_2$ which previously had been connected to ground. In addition, since the constant bias current source $I_0$ is assumed to have a very large output impedance, any process/temperature-dependent variations in the dc voltage drop have negligible effects on the bias current.

Referring back to FIG. 6, since the source terminal 601 of transistor $M_2$ is grounded while the source terminal 602 of the transistor $M_1$ is not, a slight body effect will appear. The body effect can be explained as follows. The reverse-biased junction formed between the conducting channel and the substrate, or the "body" region, in a MOS transistor behaves in a similar manner to the gate of a field effect transistor (FET). As the substrate is made more negative with respect to the source terminal of an n-channel MOS (nMOS) transistor, the depletion region between the substrate and the channel experiences a larger potential drop, and, therefore, becomes wider and contains more charge. This implies that for the same amount of surface charge in the channel of the MOSFET, a higher electric field must exist in the oxide layer between the channel and the gate electrode. This in turn implies that the gate voltage must be made more positive to achieve the same number of charge carriers in the channel. The resulting effect is an increase in the threshold voltage $V_{TH}$ as the reverse bias between the substrate and the source is increased.

Figure 8:
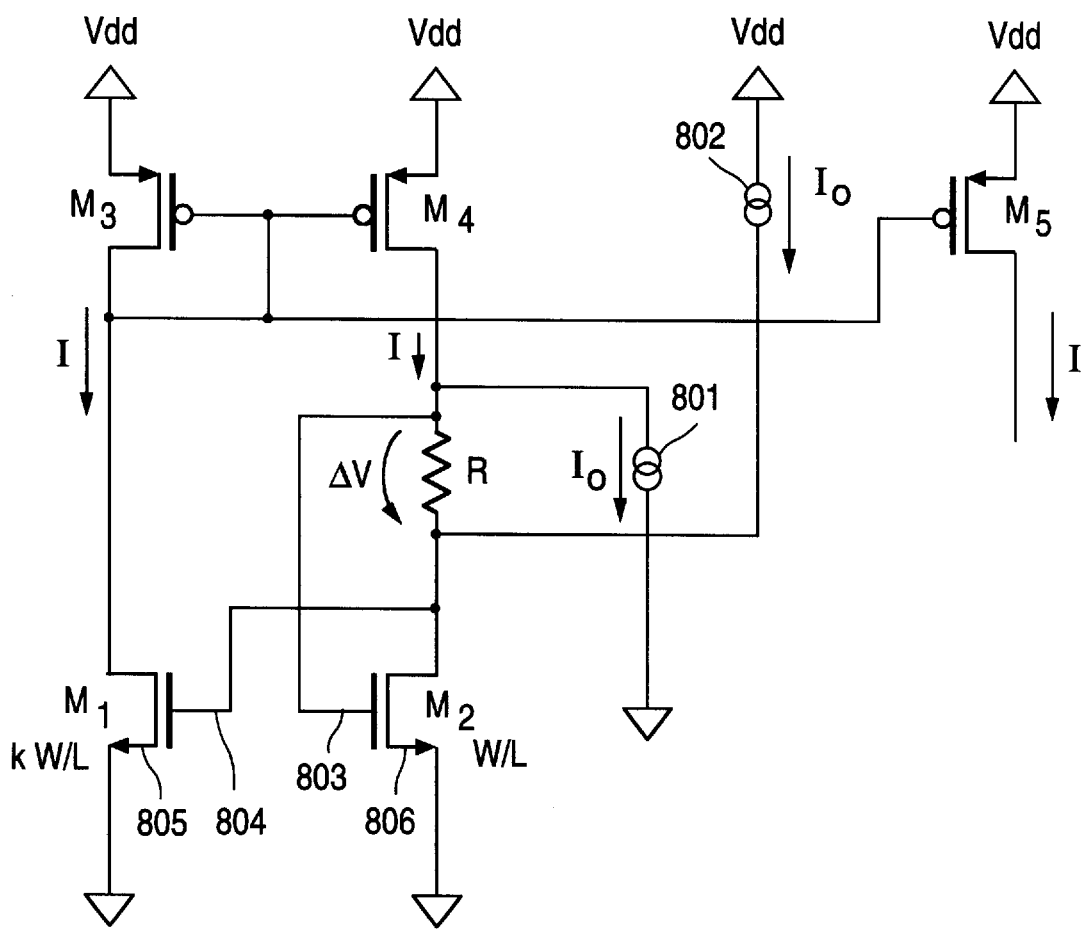
FIG. 8 illustrates another embodiment of a adaptive bias circuit according to the present invention.

FIG. 8 illustrates another embodiment of the resent invention which avoids the body effect which is described above. In this embodiment, the source terminals of transistors $M_1$ and $M_2$ are both directly grounded. Furthermore, transistors $M_1$–$M_4$ in the bias circuit are cascoded which has the advantage of reducing the channel length modulation effect, especially with short channel devices. A further advantage of this configuration is that the performance of this cascode structure is less dependent upon the voltage from the power supply. In addition, this bias circuit configuration avoids the back bias effect since nMOS transistors $M_1$ and $M_2$ are maintained at the same source potential. In other words, the drain to source voltage of these two transistors $M_1$ and $M_2$ can be matched. The resistor R is coupled between the gate terminals 803, 804 of transistors $M_1$ and $M_2$ while the source terminals 805, 806 of these transistors $M_1$ and $M_2$ are grounded. Furthermore, sourcing and sinking constant bias current $I_0$ sources are provided at each end of the resistor R respectively.

It should be noted that the two replicas of the constant bias current $I_0$ 801 and 802 are potentially additional sources of offset error. In other words, in case where the two current sources 801, 802 are not matched, an offset error may result. However, this configuration does not require a separate start-up circuit.

In another aspect of this invention, the constant bias current $I_0$, as per Equation (10), can be made to track the maximum voltage swing $V_o$ (proportional to the reference voltage). This feature allows more efficient power consumption for a range of reference voltages.

Figure 1:
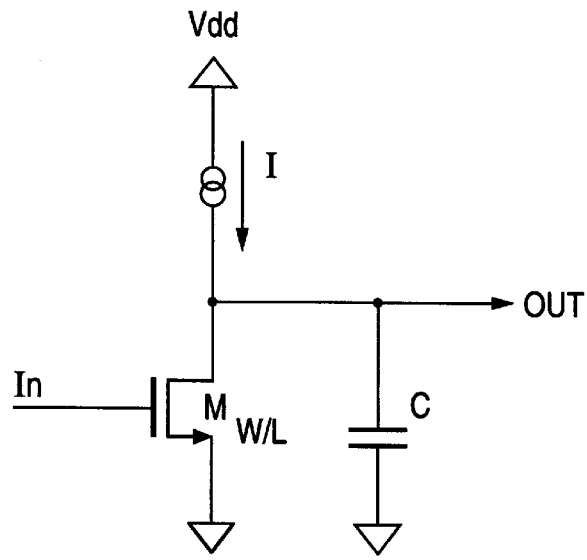
FIG. 1 illustrates a conventional MOS single stage amplifier with capacitive load.
Figure 9:
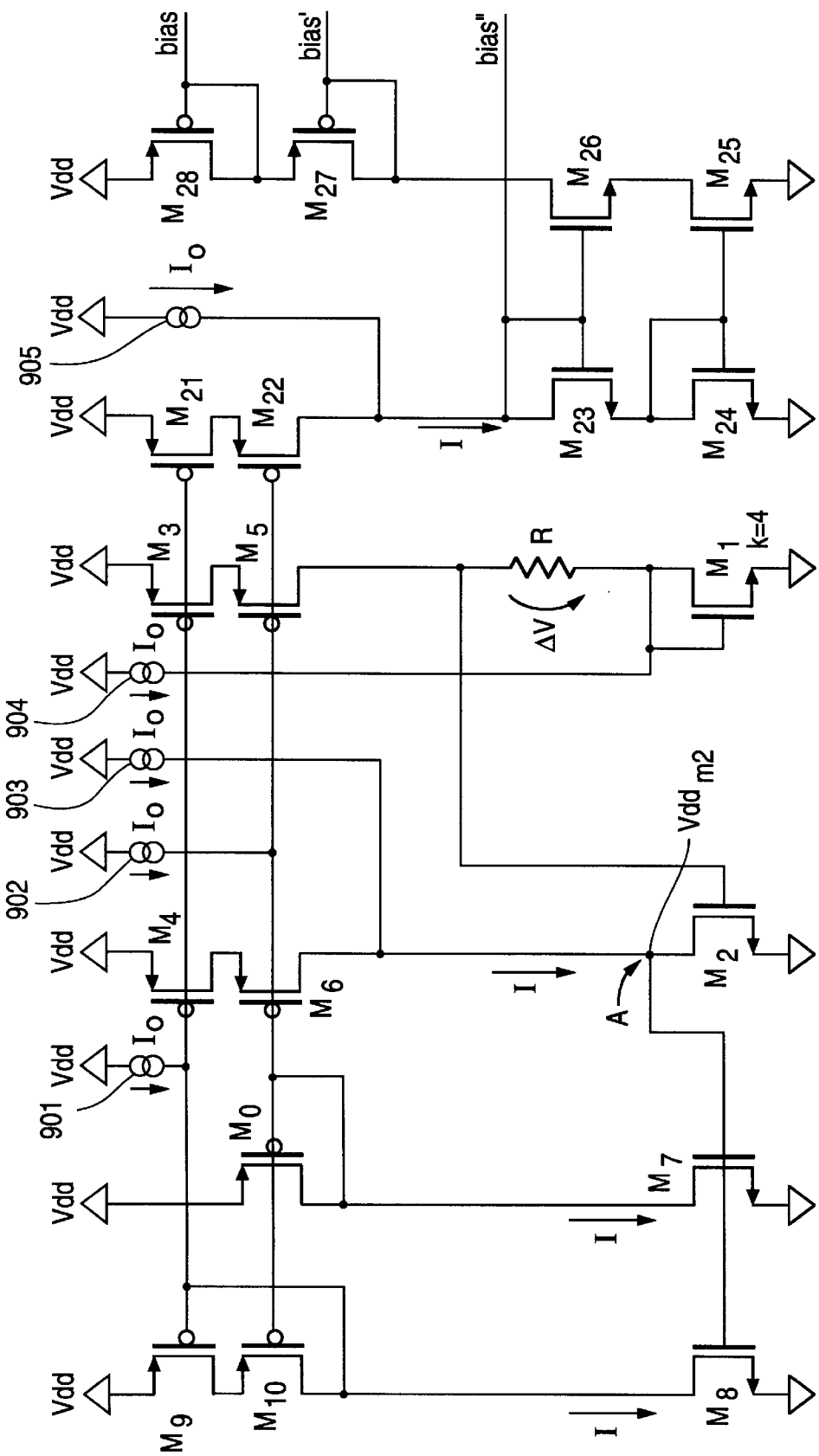
FIG. 9 illustrates a schematic diagram of yet another embodiment of an adaptive bias circuit according to the present invention.

FIG. 9 illustrates the schematic of another embodiment of the present invention. An equilibrium condition at node A requires that transistors $M_1$ and $M_2$ have the same drain current I. The feedback loop with NMOS transistor $M_8$ sets the $M_2$ drain voltage $vdd_{M2}$, thereby minimizing the voltage supply dependence. The low voltage drop PMOS cascode current mirror is implemented with transistors $M_3$–$M_6$ and $M_9$–$M_{10}$. The cascode devices are biased from diode-connected transistor $M_0$. Replicas of constant bias current sources 901, 902, 903, 904, and 905 are used to set the same constant bias current $I_0$ through all the nMOS transistors $M_1$, $M_2$, $M_7$, $M_8$, and $M_{23}$–$M_{26}$. The current through the resistor R is also the common current of all the pMOS transistors $M_3$–$M_6$, $M_9$, $M_{10}$, $M_{21}$, $M_{22}$, $M_{27}$, and $M_{28}$ in the bias circuit. Transistors $M_{23}$–$M_{26}$ form a cascode current mirror to provide the correct bias for the cascode devices in the main amplifier (FIG. 1).

Figure 2:
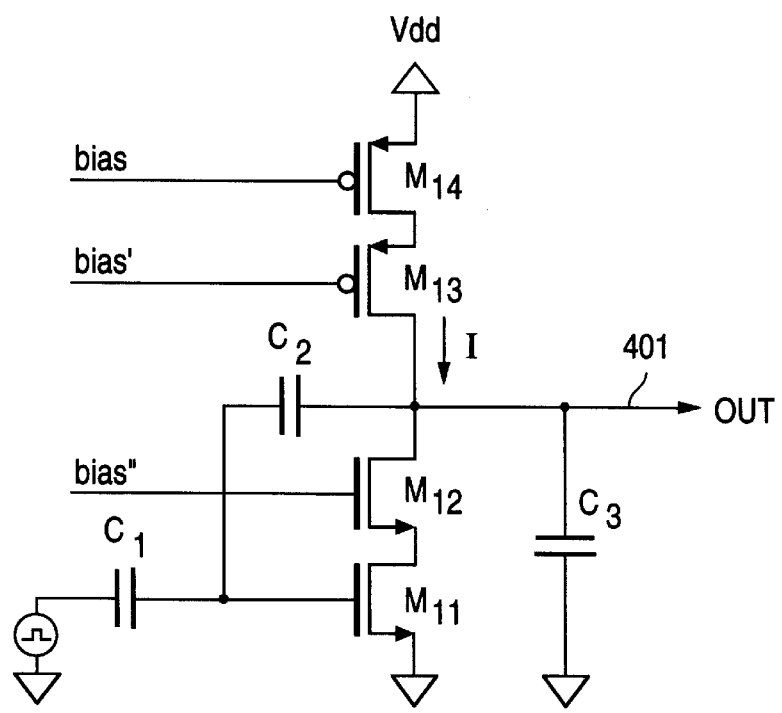
FIG. 2 illustrates a conventional single ended telescopic cascode amplifier used to obtain transient response of the bias circuit.
Figure 3:
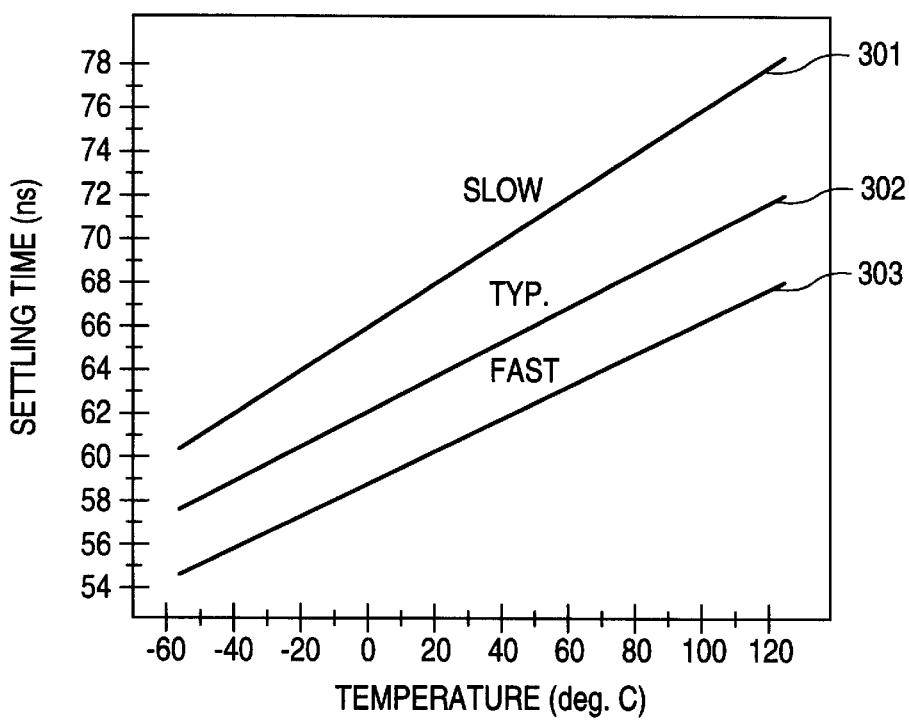
FIG. 3 illustrates the settling time as a function of temperature using a conventional constant bias current $I_0$=50 μA.
Figure 4:
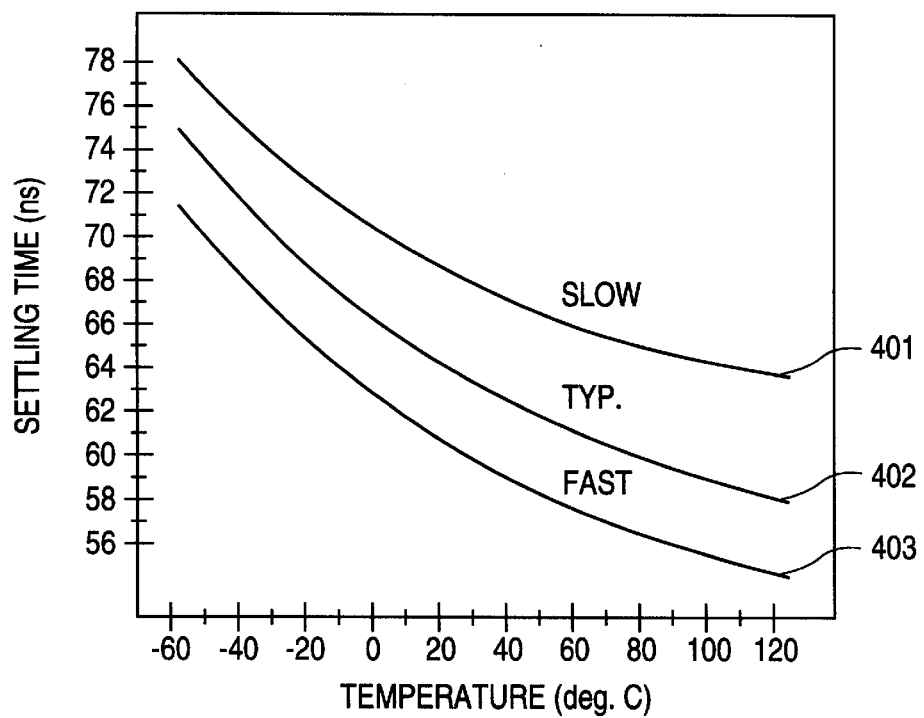
FIG. 4 illustrates settling time as a function of temperature in a conventional PTAT bias current circuit with a nominal value I=50μA.
Figure 5:
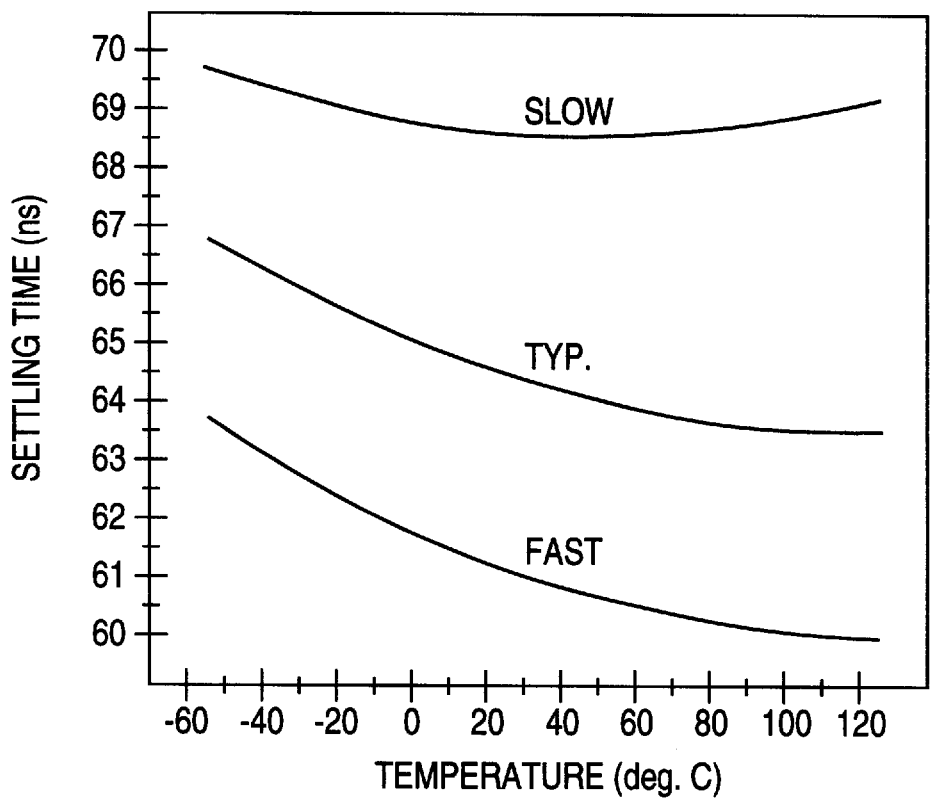
FIG. 5 illustrates settling time as a function of temperature when using a conventional partially PTAT bias current with a 2,000 ppm/deg. C. temperature coefficient.

Empirical results demonstrating the results of the present invention for variations in process and temperature of the constant bias circuit of FIG. 8 is explained with reference to FIGS. 2, 10 and 11–13. FIG. 2 shows a cascode single-ended amplifier with a bias current I provided by the cascode current source $M_{21}$–$M_{22}$ (FIG. 9) and a replica of the constant bias current source $I_0$. With the constant bias current $I_0$ set to zero, the bias current I is such that the transconductance $g_m$ of transistor $M_2$ (and therefore transistor $M_{11}$ in the main amplifier of FIG. 2) is 1/R. For a given geometric factor k=4 for transistor $M_1$, a value of the resistor R at 2.3 KΩ sets the same bias current for nominal conditions of 50 μA. Using this constant transconductance configuration, the settling time changes between 56 ns and 80 ns over process and temperature variations. The sizes (W/L in micrometer μm) of transistors $M_0$–$M_{14}$ of the bias circuit in FIG. 9 and of the amplifier in FIG. 2 are as follows. For transistors $M_0$ and $M_1$ the transistor sizes were 10/4 and 192/2, respectively. For each one of transistors $M_2$, $M_7$, $M_8$, $M_{11}$, and $M_{12}$, the transistor W/L ratio was 48/2. Transistors $M_3$–$M_6$, $M_9$, and $M_{10}$ had ratios 80/4. For the amplifier of FIG. 2, the ratios W/L of of transistors $M_{13}$ and $M_{14}$ were 160/4. In addition, for the amplifier shown in FIG. 2, the capacitors $C_1$ and $C_2$ were matched at 0.25 pF while the load capacitance was selected at double such value, i.e., 0.5 pF.

Figure 10:
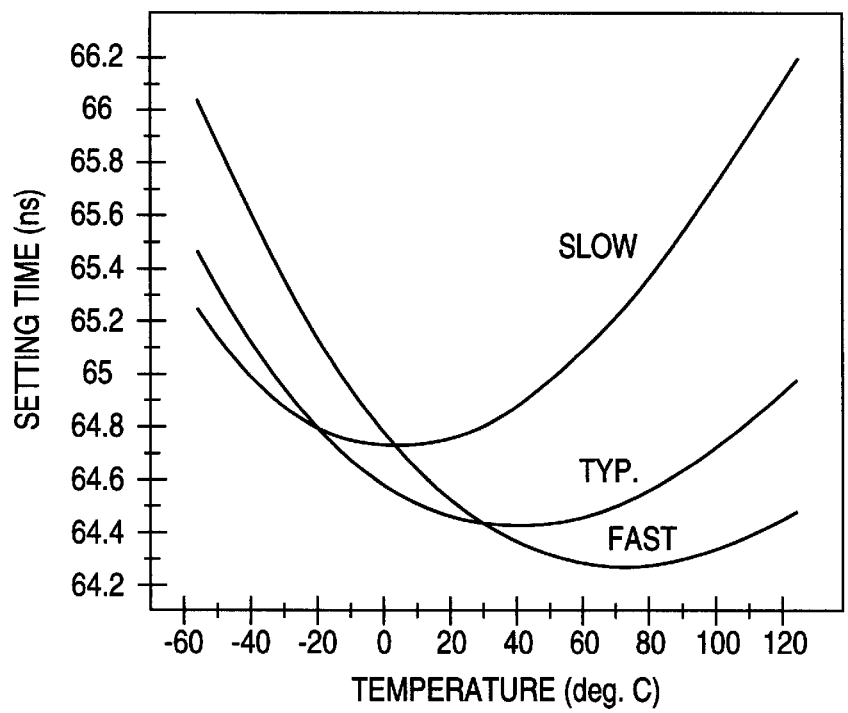
FIG. 10 illustrates settling time as a function of temperature using the bias circuit of FIG. 8.
Figure 11:
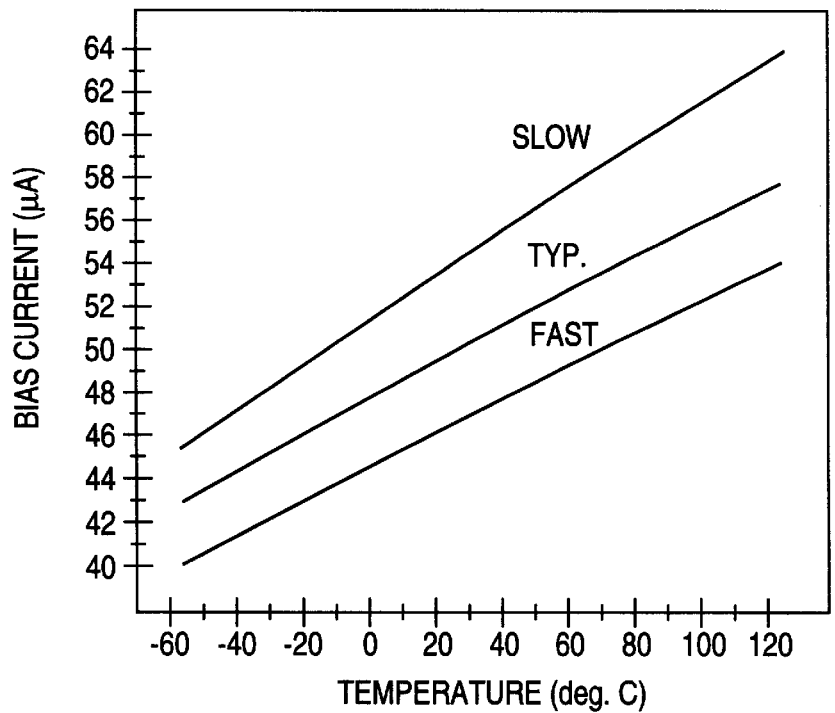
FIG. 11 illustrates a bias current as a function of temperature to maintain a quasi-constant settling time.
Figure 12:
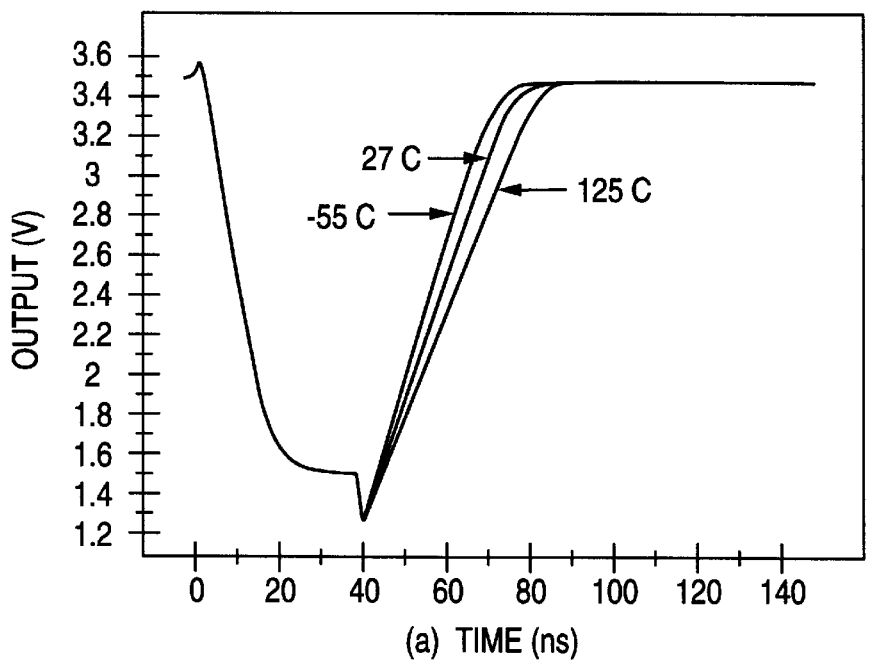
FIG. 12 illustrates the transient response for typical transistor models and three different temperatures.
Figure 13:
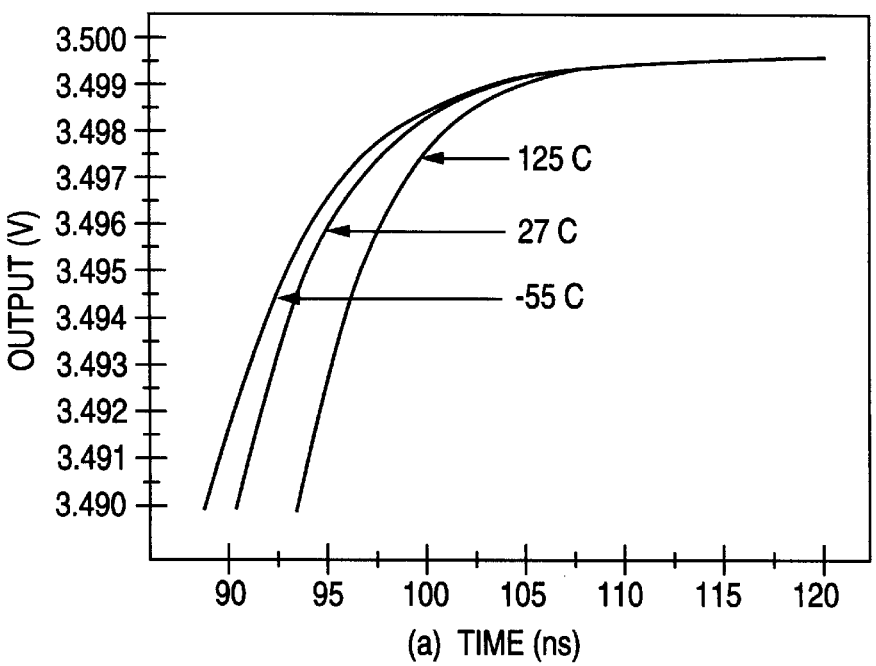
FIG. 13 illustrates the bandwidth/slew-rate trade-off to achieve a constant settling time.

The best trade-off between slew-rate and bandwidth for this circuit is obtained with a nominal resistor R=4.6 KΩ and a reference current $I_o$=25 μA. These values are in good agreement with Equations (10) and (11) for a feedback transfer function β=0.5 and a geometric factor k=4. Furthermore, to compensate for the resistance temperature coefficient, the reference current can be designed with a 1,000 parts per million per degree Celsius temperature variation. In these conditions, the total settling time variation over process and temperature is shown to be less than 3% as illustrated in FIG. 10. As shown, the variation in settling time for the three transistors, slow, typical, and fast, having different effective current densities, were approximately 64.75 ns to 66.15 ns, 54.45 ns to 65 ns, and 64.3 ns to 66.05 ns respectively, over a temperature range of –55° C. to 125° C. In addition, FIG. 11 shows the corresponding bias current as a function of temperature for the three transistor configuration. Also, the transient responses obtained for the typical transistor at three different temperatures (at 125° C., 27° C., and –55° C.) are shown in FIG. 12, while FIG. 13 illustrates the trade-off between the small signal bandwidth and slew-rate in order to maintain a constant settling time of the amplifier for the various selected temperatures As shown above, it can be seen that by dynamically varying between the small signal settling and the large signal settling, a constant overall settling time can be achieved. In other words, for high speed op amps, especially in switched capacitor applications where signal response needs to settle in accordance with a given clock cycle, the present invention allows the amplifier to settle within a given settling time precision irrespective of the variation in temperature or process.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An adaptive bias circuit for conducting a bias current over variations in operating conditions, said adaptive bias circuit comprising:

a first transistor having first, second, and third terminals;

a second transistor having fourth, fifth, and sixth terminals said fourth and sixth terminals coupled to said third terminal;

a first current source coupled to said first and fourth terminals and configured to provide first and second substantially constant bias currents thereto wherein said first transistor operates at a first effective current density and said second transistor operates at a second effective current density;

a second current source coupled to said second terminal and configured to draw a third substantially constant bias current; and a resistance coupled between said second and fifth terminals;

wherein a voltage develops across said resistance in accordance with said first and second transistors operating at said first and second effective current densities.

2. The bias circuit of claim 1 wherein said first and second substantially constant bias currents are substantially equal and wherein said first effective current density is a multiple of said second effective current density.

3. The bias circuit of claim 1 wherein said first and second transistors are nMOS transistors.

4. The bias circuit of claim 1 wherein said first current source is a current mirror.

5. The bias circuit of claim 4 wherein said current mirror comprises:

a third transistor having seventh, eighth, and ninth terminals said eighth terminal configured to receive a bias signal and said ninth terminal coupled to said seventh terminal; and a fourth transistor having tenth, eleventh, and twelfth terminals said eleventh terminal configured to receive said bias signal and said twelfth terminal coupled to said ninth terminal wherein said first and second substantially constant bias currents are substantially equal.

6. The bias circuit of claim 5 wherein said third and fourth transistors are pMOS transistors.

7. The bias circuit of claim 1 further comprising a voltage source coupled to said fifth terminal.

8. The bias circuit of claim 7 wherein said voltage source comprises a resistive element.

9. The bias circuit of claim 7 wherein said voltage source comprises a diode.

10. The bias circuit of claim 7 wherein said voltage source comprises a diode-connected MOS transistor.

11. An adaptive bias circuit for conducting a bias current over variations in operating conditions, said adaptive bias circuit comprising:

a first transistor having first, second, and third terminals, said second terminal coupled to a reference terminal;

a second transistor having fourth, fifth, and sixth terminals, said fourth terminal coupled to said third terminal and said fifth terminal coupled to said reference terminal;

a first current source coupled to said first and sixth terminals and configured to provide first and second substantially constant bias currents thereto wherein said first transistor operates at a first effective current density and said second transistor operates at a second effective current density;

a second current source coupled to said sixth terminal and configured to draw a third substantially constant bias current;

a third current source coupled to said fourth terminal and configured to provide a fourth substantially constant bias current; and a resistive element coupled between said third and sixth terminals;

wherein a voltage develops across said resistance in accordance with said first and second transistors operating at said first and second effective current densities.

12. The adaptive bias circuit of claim 11 wherein said first and second substantially constant bias currents are substantially equal and wherein said first effective current density is a multiple of said second effective current density.

13. The adaptive bias circuit of claim 11 wherein said first and second transistors are nMOS transistors.

14. The adaptive bias circuit of claim 11 wherein said first current source is a current mirror.

15. The adaptive bias circuit of claim 14 wherein said current mirror comprises:

a third transistor having seventh, eighth, and ninth terminals said eighth terminal configured to receive a bias signal and said ninth terminal coupled to said seventh terminal; and a fourth transistor having tenth, eleventh, and twelfth terminals said eleventh terminal configured to receive said bias signal and said twelfth terminal coupled to said ninth terminal wherein said first and second substantially constant bias currents are substantially equal.

16. The adaptive bias circuit of claim 15 wherein said third and fourth transistors are pMOS transistors.

17. The adaptive bias circuit of claim 11 wherein said third and fourth substantially constant bias currents are substantially equal.

* * * * *